US012639942B2

(12) United States Patent
Huangfu et al.

(10) Patent No.:  US 12,639,942 B2
(45) Date of Patent:      May 26, 2026

(54) ARTIFACT PROCESSING IN VIDEO USING TEXTURE INFORMATION

(71) Applicants:Disney Enterprises, Inc., Burbank, CA (US); Beijing YoJaJa Software Technology Development Co., Ltd., Beijing (CN)

(72) Inventors: Xuchang Huangfu, Beijing (CN); Yuanyi Xue, Alameda, CA (US); Wenhao Zhang, Beijing (CN); Yang Zhang, Dübendorf (CH); Chen Liu, Beijing (CN); Xuewei Meng, Beijing (CN)

(73) Assignees: Disney Enterprises, Inc., Burbank, CA (US); Beijing YoJaJa Software Technology Development Co., Ltd., Beijing (CN)

( * ) Notice: Subject to any disclaimer, the term of this patent is extended or adjusted under 35 U.S.C. 154(b) by 92 days.

(21) Appl. No.: 18/653,592

(22) Filed: May 2, 2024

(65) Prior Publication Data

US 2025/0342689 A1      Nov. 6, 2025

(51) Int. Cl.
*G06V 10/98*      (2022.01)
*G06T 11/00*      (2026.01)
*G06V 10/22*      (2022.01)
*G06V 10/26*      (2022.01)
*G06V 10/36*      (2022.01)
(Continued)

(52) U.S. Cl.
CPC .......... *G06V 10/993* (2022.01); *G06T 11/001* (2013.01); *G06V 10/22* (2022.01); *G06V 10/273* (2022.01); *G06V 10/36* (2022.01);

*G06V 10/54* (2022.01); *G06V 10/761* (2022.01); *G06V 10/764* (2022.01)

(58) Field of Classification Search
CPC .... G06V 10/993; G06V 10/22; G06V 10/273; G06V 10/36; G06V 10/54; G06V 10/761; G06V 10/764; G06T 11/001
See application file for complete search history.

(56) References Cited

U.S. PATENT DOCUMENTS 8,532,198 B2      9/2013  Kumwilaisak et al.
10,949,604 B1 *   3/2021  Dwivedi ............... G06V 30/414
(Continued)

FOREIGN PATENT DOCUMENTS

CN      105551062 A  *  5/2016
CN      109376731 A  *  2/2019  ............ G06F 18/24
(Continued)

OTHER PUBLICATIONS

Extended European Search Report for EP App No. 24170914.6, dated Sep. 30, 2024, 16 pgs.
(Continued)

*Primary Examiner* — Said Broome
*Assistant Examiner* — Denis Vasiliy Minko
(74) *Attorney, Agent, or Firm* — Kwan & Olynick LLP

(57)      ABSTRACT

In some embodiments, a method receives an image to analyze for artifacts. Texture information that characterizes texture in the image is determined. The method merges the texture information with the image. The texture information is used to focus an analysis of artifacts in regions of the image. The method outputs a score based on the processing of the image that assesses the artifacts in the image.

20 Claims, 16 Drawing Sheets

(51) Int. Cl.
    *G06V 10/54*       (2022.01)
    *G06V 10/74*       (2022.01)
    *G06V 10/764*     (2022.01)

(56) References Cited

U.S. PATENT DOCUMENTS

| | | | |
|---|---|---|---|
| 2007/0103551 A1 | 5/2007 | Kim et al. | |
| 2010/0135575 A1 | 6/2010 | Guo et al. | |
| 2013/0093768 A1* | 4/2013 | Lockerman | G06T 11/001 |
| | | | 345/428 |
| 2017/0078706 A1 | 3/2017 | Van Der Vleuten et al. | |
| 2018/0034852 A1* | 2/2018 | Goldenberg | H04L 63/1416 |
| 2018/0167620 A1 | 6/2018 | Li et al. | |
| 2019/0156459 A1* | 5/2019 | Chen | G06T 3/4053 |
| 2019/0261016 A1* | 8/2019 | Liu | G06N 3/08 |
| 2019/0340468 A1 | 11/2019 | Stumpe et al. | |
| 2020/0352518 A1 | 11/2020 | Lyman et al. | |
| 2022/0414402 A1 | 12/2022 | Sawkey | |
| 2023/0098732 A1 | 3/2023 | Alemi et al. | |
| 2023/0131228 A1 | 4/2023 | Wang et al. | |
| 2023/0187072 A1 | 6/2023 | Neumann | |
| 2023/0274818 A1 | 8/2023 | Etemadi | |
| 2023/0282012 A1* | 9/2023 | Borges | G06T 11/001 |
| | | | 382/100 |
| 2024/0296535 A1 | 9/2024 | Bakunov et al. | |

FOREIGN PATENT DOCUMENTS

| | | | | | |
|---|---|---|---|---|---|
| CN | 114170198 A | * | 3/2022 | | G06F 18/2414 |
| CN | 117935180 A | * | 4/2024 | | G06V 10/75 |
| EP | 4456539 A3 | | 10/2024 | | |
| JP | 4527127 B2 | * | 8/2010 | | G06V 30/413 |
| WO | WO-2019125026 A1 | * | 6/2019 | | A61B 6/03 |
| WO | 2023235730 A1 | | 12/2023 | | |

OTHER PUBLICATIONS

Tandon Pulkit et al: "CAMBI: Contrast-aware Multiscale Banding Index", 2021 Picture Coding Symposium (PCS), IEEE, Jun. 29, 2021 (Jun. 29, 2021), pp. 1-5, XP033945096,DOI: 10.1109/PCS50896.2021.9477464 [retrieved on Jul. 7, 2021], 5 pgs.

Testolina Michela et al: "Review of subjective quality assessment methodologies and standards for compressed images evaluation", Proceedings of the SPIE, SPIE, US, val. 11842, Aug. 1, 2021 (Aug. 1, 2021), pp. 118420Y-118420Y, XP060146862, ISSN: 0277-786X, DOI: 10.1117/12.2597813 ISBN: 978-1-5106-5738-0, 14 pgs.

Tu Zhengzhong et al: "Bband Index: a No-Reference Banding Artifact Predictor", ICASSP 2020-2020 IEEE International Conference on Acoustics, Speech and Signal Processing (ICASSP), IEEE, A,P May 4, 2020 (May 4, 2020), pp. 2712-2716, XP033793303, DOI: 10.1109/ICASSP40776.2020.9053634 [retrieved on Apr. 1, 2020], 5 pgs.

Xiang Jie et al: "A Deep Learning-Based No-Reference Quality Metric for High-Definition Images Compressed With HEVC" I IEEE Transactions on Broadcasting, IEEE Service Center, Piscataway, NJ, US, val. 69, No. 3, Sep. 1, 2023 (Sep. 1, 2023), pp. 779-789, XP011948768, ISSN: 0018-9316, DOI: 10.1109/TBC.2023.3277193 [retrieved on Jun. 2, 2023], 11 pgs.

Xue Yuanyi et al: "Large-Scale Multi-Site 1-15 Subjective Assessment on Image Banding Artifacts", 2023 15th International Conference on Quality of Multimedia Experience {QOMEX), IEEE, Jun. 20, 2023 (Jun. 20, 2023), pp. 213-216, XP034379507, DOI: 10.1109/QOMEX58391.2023.10178613 [retrieved on Jul. 18, 2023], 4 pgs.

Ying Zhenqiang et al: "Patch-VQ: 'Patching Up' the Video Quality Problem", 2021 IEEE/CVF Conference on Computer Vision and Pattern Recognition (CVPR), IEEE,Jun. 20, 2021 (Jun. 20, 2021), pp. 14014-14024, XP034008989, DOI: 10.1109/CVPR46437.2021.01380 [retrieved on Oct. 15, 2021], 11 pgs.

Chen Zijian et al: "BAND-2k: Banding 1-15 INV. Artifact Noticeable Database for Banding G06T7/40 Detection and Quality Assessment", IEEE Transactions on Circuits and Systems for Video Technology, IEEE, USA, vol. 34, No. 7, Feb. 15, 2024 (Feb. 15, 2024), pp. 6347-6362, XP011974344.

Extended European Search Report, EP Application No. 25157981.9, mailed Jul. 1, 2025, 10 pages.

"SSIMWAVE", IMAX Streaming and Consumer Technology (IMAX SCT), Retrieval date: Apr. 10, 2024. Retrieved from internet: https://www.imax.com/sct/product/streamsmart-on-demand.

"FFmpeg", FFmpeg Developers, Retrieval date: Apr. 10, 2024. Retrieved from internet: https://ffmpeg.org/.

Campbell, Fergus W., and John G. Robson. "Application of Fourier analysis to the visibility of gratings." The Journal of physiology 197, No. 3 (1968): 551.

ITU-T, Recommandation. "BT.500-14 Methodology For the Subjective Assessment of the Quality of Television Pictures." International Telecommunication Union, Geneva. 2019.

ITU-T, Recommandation. "P910 Subjective video quality assessment methods for multimedia applications." International Telecommunication Union, Geneva. 2022.

ITU-T, Recommendation. "P911 Subjective Audiovisual Quality Assessment Methods for Multimedia Applications." International Telecommunication Union, Geneva. 1998.

Kapoor, Akshay, Jatin Sapra, and Zhou Wang. "Capturing banding in images: Database construction and objective assessment." In ICASSP 2021-2021 IEEE International Conference on Acoustics, Speech andSignal Processing (ICASSP), pp. 2425-2429. IEEE, 2021.

Mittal, Anish, Anush Krishna Moorthy, and Alan Conrad Bovik. "Noreference image quality assessment in the spatial domain." IEEE Transactions on image processing 21, No. 12 (2012): 4695-4708.

Tandon, Pulkit, Mariana Afonso, Joel Sole, and Lukáš Krasula, "CAMBI: Contrast-aware multiscale banding index." In 2021 Picture Coding Symposium (PCS), pp. 1-5. IEEE, 2021.

Tu, Zhengzhong, Jessie Lin, Yilin Wang, Balu Adsumilli, and Alan C. Bovik. "Adaptive debanding filter." IEEE Signal Processing Letters 27 (2020): 1715-1719.

Mingyang Song et al., "A Generative Model for Digital Camera Noise Synthesis", ETH Zurich, Switzerland; Disney Research Studios, Mar. 17, 2023, 18 pages.

Madhusudana, Pavan C. et al, "Image Quality Assessment Using Contrastive Learning." IEEE Transactions on Image Processing, Oct. 25, 2021, 10 pages.

U.S. Appl. No. 18/633,170, filed Apr. 11, 2024, Inventor Yuanyi Xue et al, Titled: "Subjective Quality Assessment Tool for Image/Video Artifacts", 39 pages, Accessible via Patent Center.

Examination Report (Art. 94(3) EPC), European Patent Application 24 170 914.6, mailed Oct. 10, 2025, 13 pages.

\* cited by examiner

500

700

Pixel Intensity

Texture region

702

Banding region

704

Smooth region

706

ARTIFACT PROCESSING IN VIDEO USING TEXTURE INFORMATION

BACKGROUND

Artifacts in digital video may be distortions that appear in the video. Different types of artifacts may occur. For example, one artifact is banding, which may be where a continuous change of luminance and chrominance becomes a sudden drop in values creating visible bands that should not be present in the video. The banding artifact may occur when the available bit depth for presenting the luminance or chrominance information is limited. That is, having 8 bits to represent the luminance and chrominance information may result in more visible bands compared to having more bit depth, such as 10 or 12 bits, to represent the luminance and chrominance information. Other artifacts may also result in video for different reasons.

A video delivery system may want to mitigate the occurrence of the artifacts that may occur in a video. However, it may be challenging to identify and measure the artifacts, and then later mitigate the artifacts.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
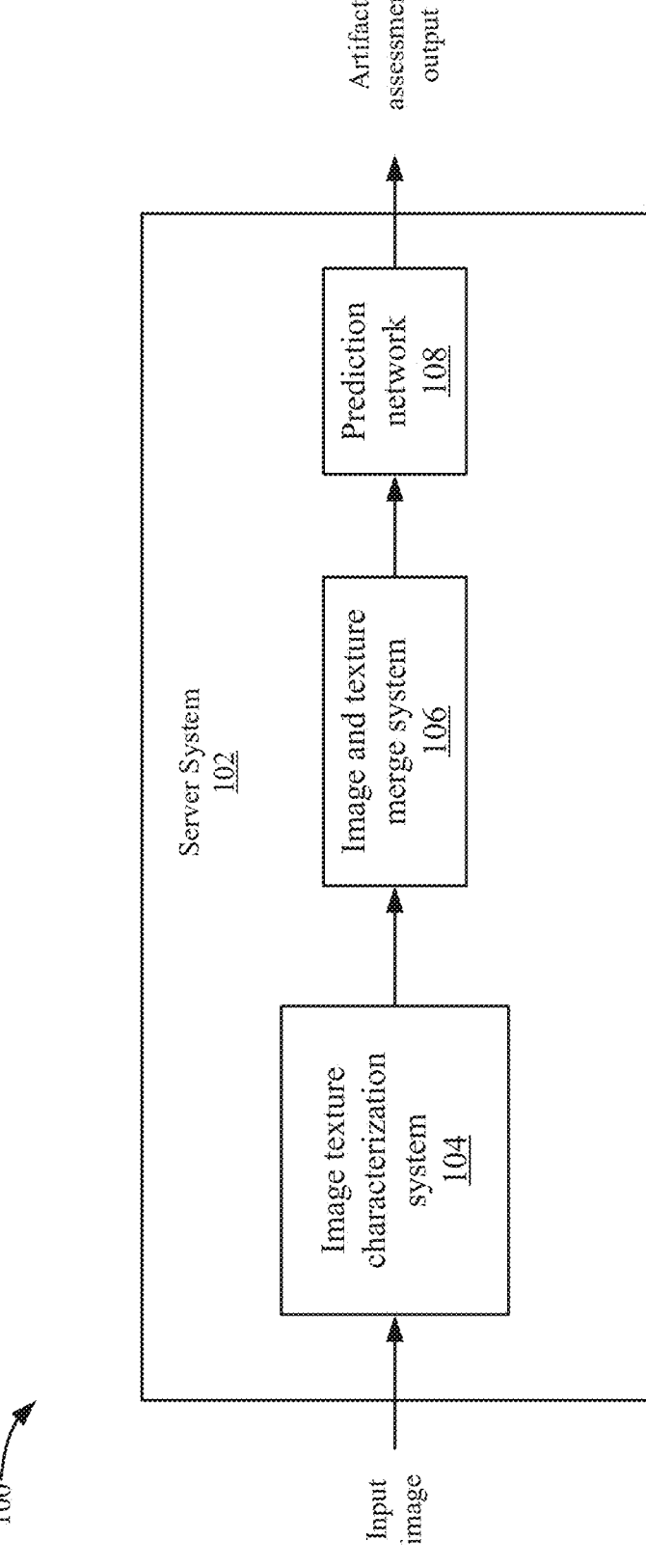
FIG. 1 depicts a simplified system for processing artifacts according to some embodiments.

Described herein are techniques for a content analysis system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system automatically generates an assessment of artifacts, such as banding artifacts, in content (e.g., an image or a frame of video). The system includes a pre-processing system that can extract information about the content of an image, such as texture information of the image. Then, the system merges the information with the image to perform the assessment of artifacts in the image. For example, the assessment of artifacts may use the texture information to focus the analysis on regions that may be more susceptible to having perceptible artifacts. In some examples, there may be regions that have a complex texture and regions that have a smoother texture. The artifacts may be more likely to be perceived by a user (e.g., human eyes) in a region that includes pixels with texture that is closer to the smooth texture. The complex texture may make any artifacts harder to perceive or not visible. Using the texture information to focus on regions that may be prone to have more perceptible artifacts may improve the assessment of artifacts for multiple reasons, such as computing resources may be focused on the identified regions where artifacts may be perceived by a human user. This may also save computing resources as some regions where artifacts may not be perceptible may not be processed. The assessment results may also be improved as more resources may be focused on assessing artifacts in regions in which the artifacts may be perceptible compared to analyzing the entire image.

The following will describe different processes that use the texture information differently. For example, the system may use texture information that is incorporated as auxiliary input into a prediction network. The texture information may be input with an image into the prediction network, which combines the texture information with the image. Or, the prediction network may use the texture information in a weighting or attention function within a latent space in the prediction network. In other embodiments, the texture information may be used to analyze the texture of different regions in an image. For example, the texture information may be used to segment an image into different regions. The regions may then be processed separately. In some embodiments, the texture information can be used to identify and classify different types of textures in the regions, such as classifying regions as a smooth region, a banding region, or a complex texture region. The region types may be used to alter the image, such as mask the image directly. Also, the region types may be used to provide supplemental information to the prediction network that will be used when processing the regions. The following will describe these processes in more detail.

System

FIG. 1 depicts a simplified system 100 for processing artifacts according to some embodiments. A server system 102 may include one or more computing devices that can process input content to generate an output based on an assessment of the artifacts identified in the input content. The input may be an image, which may be an image from a frame of a video or an image from another source (e.g., a picture). Multiple images may be processed, such as multiple images from frames of one or more videos. The output may be an artifact assessment score that rates a severity of artifacts in the image. Also, the output may include the identification of regions where artifacts are deemed perceptible in the image. Different results will be described in more detail below.

The artifacts may be distortions that appear in images of the video that should not be present in the images. The image may include multiple instances of an artifact (e.g., banding artifacts) that may be included in different regions of the image. The following may discuss banding artifacts, but other artifacts may be appreciated, such as blocking artifacts, blurring artifacts, noise, network artifacts, compression artifacts, or any other artifacts.

To improve the assessment of artifacts, the following may use a pre-processing process that determines information about the content of the image. In some embodiments, the information may be texture information, but other types of information may be used. An image texture characterization system 104 (hereinafter "texture characterization system 104") may receive the input image and determine a texture characterization that describes variations in a characteristic of the image. The image texture may be visual patterns or structures that characterize properties of the image. The texture may be described differently using variations in different characteristics, such as variations in pixel intensities, etc. The texture may be described in a texture map that includes values for texture for pixels of the image. In some embodiments, texture characterization system 104 may use edge detectors that may take the luma component intensity difference to generate a gradient for each pixel. The edge detectors may use different filters to generate the gradient. Also, texture characterization system 104 may also use the average local pixel value difference to generate the average local pixel value difference (ALD) to generate the average local pixel value difference for each pixel. The average local pixel value difference may measure a variation in pixel intensity within a region of the image. Texture characterization system 104 may output multi-scale texture maps along with different scales of the images of their corresponding size or just output a single-size texture map. Also, image texture characterization system 104 may use entropy to characterize the texture. The entropy of the image may be a measure of randomness present in the distribution of pixel intensities within the image. The entropy may be calculated to generate a multi-scale texture map along with images of the corresponding size, or a single-size texture map. Although the above methods are described for measuring texture, other methods may be used.

The texture characterization is sent to an image and texture merge system 106 (hereinafter "texture merge system 106") that can merge the texture characterization with the image. The merge may be performed in different ways. For example, texture merge system 106 may incorporate the texture maps as auxiliary input to a prediction network 108. Also, texture merge system 106 may concatenate the texture map with the image or input the texture map as a weighting or attention function within prediction network 108. In other embodiments, texture merge system 106 may perform texture-based segmentation using the texture map to segment the image based on texture differences. Texture merge system 106 may separate the regions based on the textual characteristics. The regions may be processed differently, such as some regions that may not be prone to perceptible artifacts may not be input into prediction network 108 or may be identified as regions that are not focused on by prediction network 108. Then, texture merge system 106 may classify the texture in different regions in the image into region types. Texture merge system 106 may then use the region types to mask the input image directly or input the masking information into prediction network 108, which uses the masking information when processing the image. The above processes will be described in more detail below.

Prediction network 108 may be a neural network that is trained to receive input and output an artifact assessment. Prediction network 108 can accept the size and dimension of the image, which may or may not be masked using the texture map. If the texture map is concatenated with the image, where the image is input as another channel, prediction network 108 may concatenate the input image as another channel inside the neural network and it may include a channel as input for the texture map. If the texture map is used as a weighting or attention function, prediction network 108 is configured to derive weighting factors for the image based on the texture map.

The output of prediction network 108 may be different artifact assessments. For example, the output may be multi-dimensional features to indicate the severity of artifacts indirectly, a continuous number to indicate the severity of banding artifacts, a classification number with a limited set of values to indicate the severity of banding artifacts. The continuous number may be a regression work output number that may be a continuous numerical value that represents the estimate of the severity of the banding artifacts. The classification number may be a classification work output number that may be a value within the limited set of values to indicate the severity of the banding artifacts. The classification work output number may output probabilities over multiple classes, which may be different severities of banding artifacts. The scores can be in different ranges, such as 0~100, 0~5, etc. The higher score can mean the more severe banding artifacts or vice versa. In some embodiments, the system can use the banding scores to determine whether to do artifact mitigation on an image/video, such as a dithering process or not. For example, if a higher banding score means more severe banding artifacts, the system may set a threshold/multi-thresholds to determine whether to perform a dithering operation and the strength of the dithering operation. The dithering can be performed on an image or video.

Figure 2:
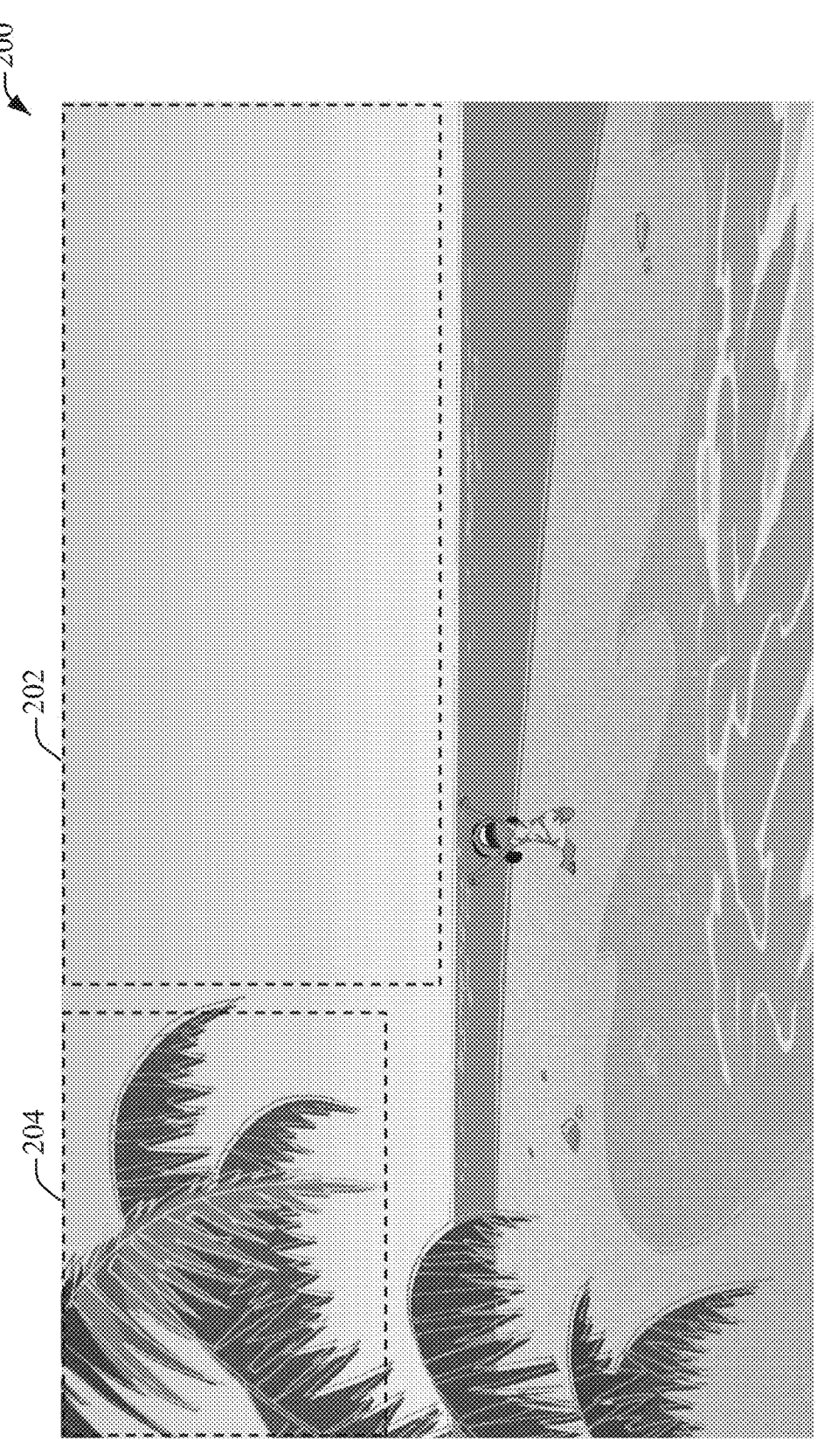
FIG. 2 depicts an example of an image according to some embodiments.

The following will describe an example of banding artifacts. FIG. 2 depicts an example of an image 200 according to some embodiments. Banding artifacts may be visible in image 200. Banding artifacts may be a type of staircase-like imperfections in an image, which may be introduced by digital video processing and encoding. In some embodiments, the banding artifacts may be more perceptible and appear in large and smoother regions. The banding artifacts may occur when the pixel bit depth for the video is reduced or quantized during a video format conversion, video compression, etc. A studio mezzanine file usually uses a high bit depth, (e.g., 10-bit/12-bit per color plane) high-quality format; however, a video delivery service may deliver video content to client devices using a lower bit depth, such as 10-bit or even 8-bit per color plane. The lower bit depth version of the video along with quantization may be prone to introducing banding artifacts. Some banding artifacts may be difficult to access. For example, the banding artifacts may not be severe or obvious and may be very subtle compared to the texture found in the image.

Within the dotted rectangle at 202, banding artifacts may be visible as staircase-like imperfections. Region 202 may be a large and smooth region. There may be banding artifacts in other regions of the image also, but they may be less perceptible. A region 204 may include more complex texture of a palm tree. The more complex texture may mask the banding artifacts and make the banding artifacts less perceptible. There may also be regions where banding artifacts are less perceptible or no banding artifacts are found, such as in the sand or water of the image. The above is just one example of where banding artifacts may occur and other examples may be appreciated.

The following will now describe the different methods of merging the input image with the texture characterization. A first embodiment may describe the use of the texture characterization to analyze different regions of the image. Then, a second embodiment uses the texture map as auxiliary input to prediction network 108.

Texture Characterization of Different Regions

Figure 3:
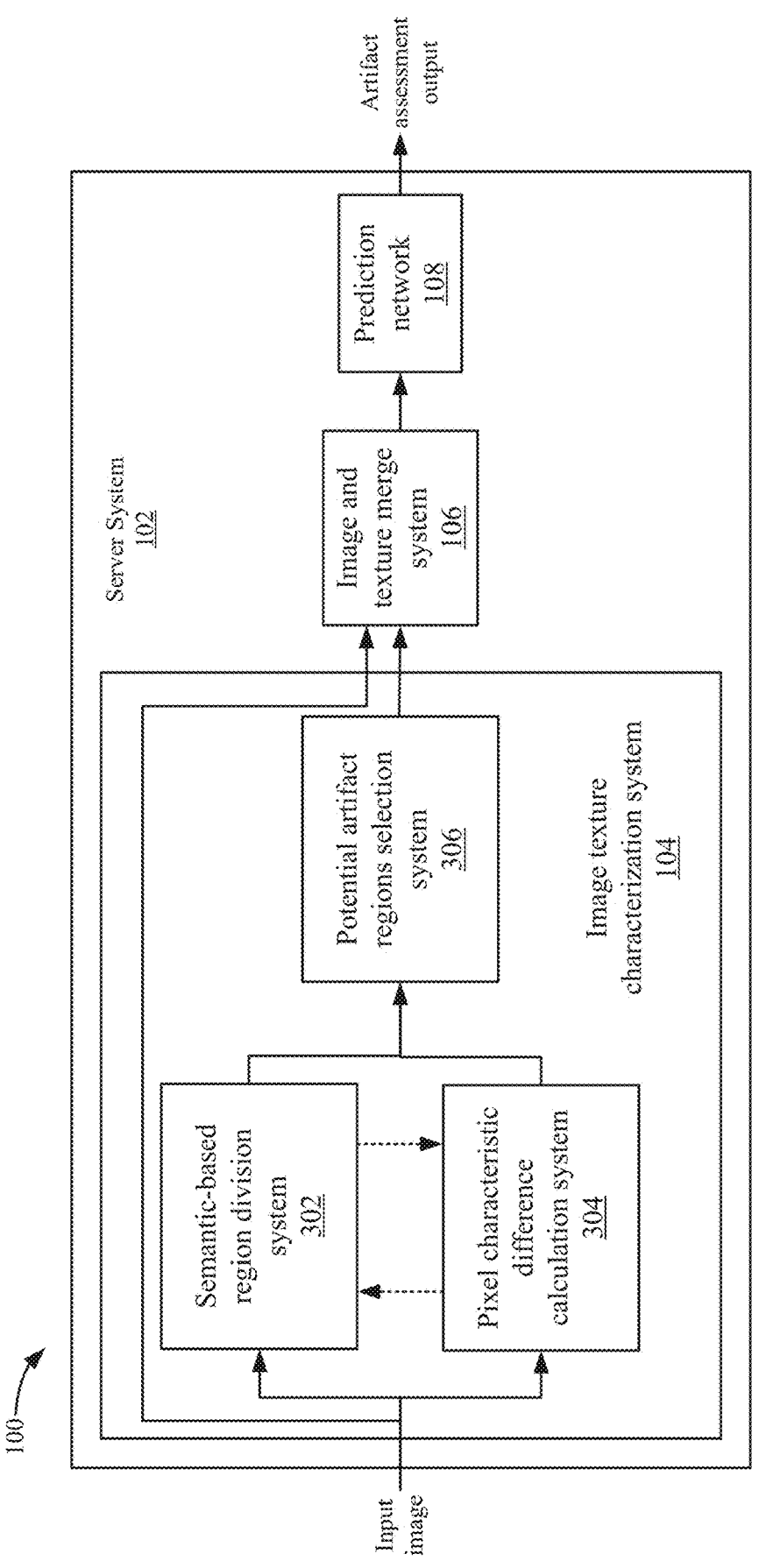
FIG. 3 depicts a more detailed example of a server system for analysis of regions of an image according to some embodiments.

FIG. 3 depicts a more detailed example of server system 102 for analysis of regions of an image according to some embodiments. Image texture characterization system 104 receives the input image and can perform pre-processing to define regions. For example, a semantic-based region division system 302 (hereinafter "region division system 302") performs a semantic-based region division that divides the input image into different regions based on semantic similarity of portions (e.g., blocks) of pixels in the image. Region division system 302 may use object segmentation methods to divide the input image into different objects. A corresponding region of each object in the image may be output. Different methods may be used to determine the regions with the objects, such as selecting a border that encompasses the object.

A pixel characteristic difference calculation system 304 (hereinafter "difference calculation system 304") may calculate a difference or variation in a characteristic for pixels of the input image. In some embodiments, difference calculation system 304 uses an intensity difference, such as a luma component intensity difference, but other characteristics may be used. The pixel intensity difference may refer to the gradient of pixels or the average local pixel value difference. Difference calculation system 304 may use different methods to determine the gradient or the average local pixel value difference. For example, the gradient of each pixel may be generated using filters that detect a rate of change of pixel intensities. The pixel intensity may measure the brightness or darkness of a pixel and may be represented by an intensity value or values. The average local pixel value difference is the measure of local image texture variation in the pixel intensity. For each pixel, the average may be determined for the pixel value differences within different-sized regions. The output of difference calculation system 304 may be a pixel intensity difference map. For example, for each pixel of the image, a value for the pixel intensity difference is provided. If multiple channels are being used, such as red, green, and blue, a pixel intensity difference map for each channel may be calculated.

Region division system 302 and difference calculation system 304 may be run in parallel or sequentially. In some embodiments, there may be three potential orders of the systems. First, region division system 302 and difference calculation system 304 may be run in parallel. In this case, no interaction between the two systems may occur. Second, difference calculation system 304 is run first. Then, the results of the pixel intensity difference map may be used to guide region division system 302 to divide regions adaptively. For example, if regions have a high pixel intensity difference, region division system 302 may not perform region division or may tag these regions as a same region type. The high-pixel intensity difference may indicate that this region has complex texture and artifacts may not be perceptible in this region. This may save computing resources if these regions are not processed.

Third, region division system 302 may be run first. The segmented regions that are output may be used by difference calculation system 304 to calculate the pixel intensity difference adaptively. For example, if the divided regions are too small, the pixel intensity difference calculation may be skipped and these regions may be set to a value to indicate that these regions will not have perceptible banding artifacts. For example, small regions may not have visible artifacts that are perceptible. Computing resources may be saved by not analyzing these smaller regions.

A potential artifact regions selection system 306 (hereinafter "selection system 306") may select regions that may have artifacts that should be analyzed. In some embodiments, the regions are classified as different region types according to the pixel intensity difference. For example, regions may be classified as a texture region, a banding region, and a smooth region. The classification of the regions will be described below in FIGS. 6, 7, 8, and 9. The regions may be input into texture merge system 106. As described above, texture merge system 106 may use different methods of merging the information that will be input into prediction network 108.

Figure 4:
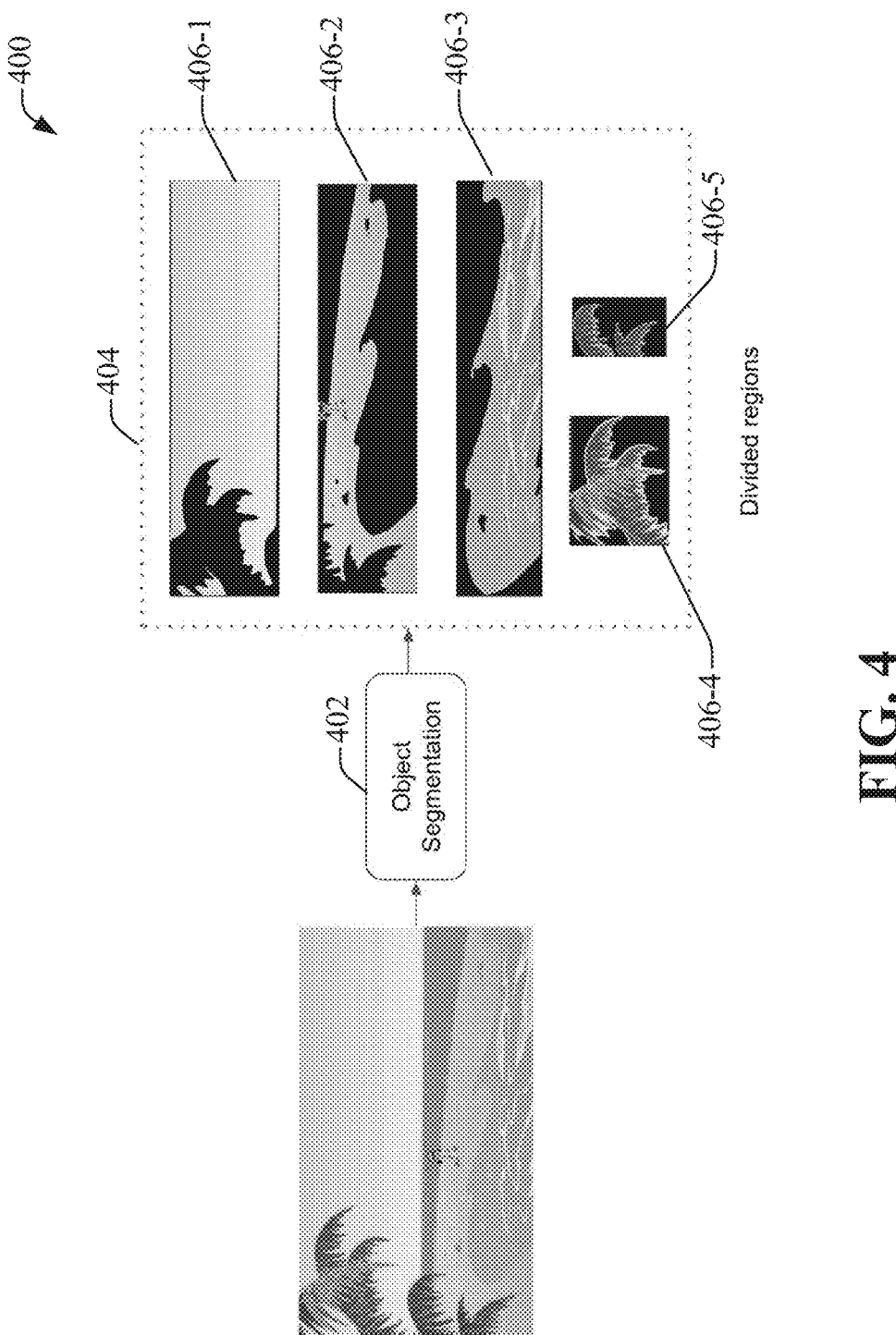
FIG. 4 depicts an example of object segmentation using a region division system according to some embodiments.

As discussed above, region division system 302 may perform object segmentation to generate regions. FIG. 4 depicts an example 400 of object segmentation using region division system 302 according to some embodiments. At 402, an image is received and object segmentation is performed by region division system 302. The result of object segmentation results in multiple objects, such as the palm tree, beach, sky, etc. The objects may be used to generate regions that are shown at 404. For example, regions 406-1, 406-2, 406-3, 406-4, and 406-5 are different portions of the image that result from the object segmentation. The segmented regions include different characteristics. For example, region 406-1 includes a large area that includes a smooth texture. The object detected in this region may correspond to the sky. The object segmentation may also mask out other objects in the region, such as the tree may be masked out by the object segmentation. The masking may filter the texture from the image. Regions 406-4 and 406-5 include complex texture of the palm tree and are smallest in size. The background of the sky may be masked out. Regions 406-2 and 406-3 include areas of the sand. The regions are also different sizes where region 406-1, 406-2, 406-3 are larger than regions 406-4 and 406-5.

Figure 5:
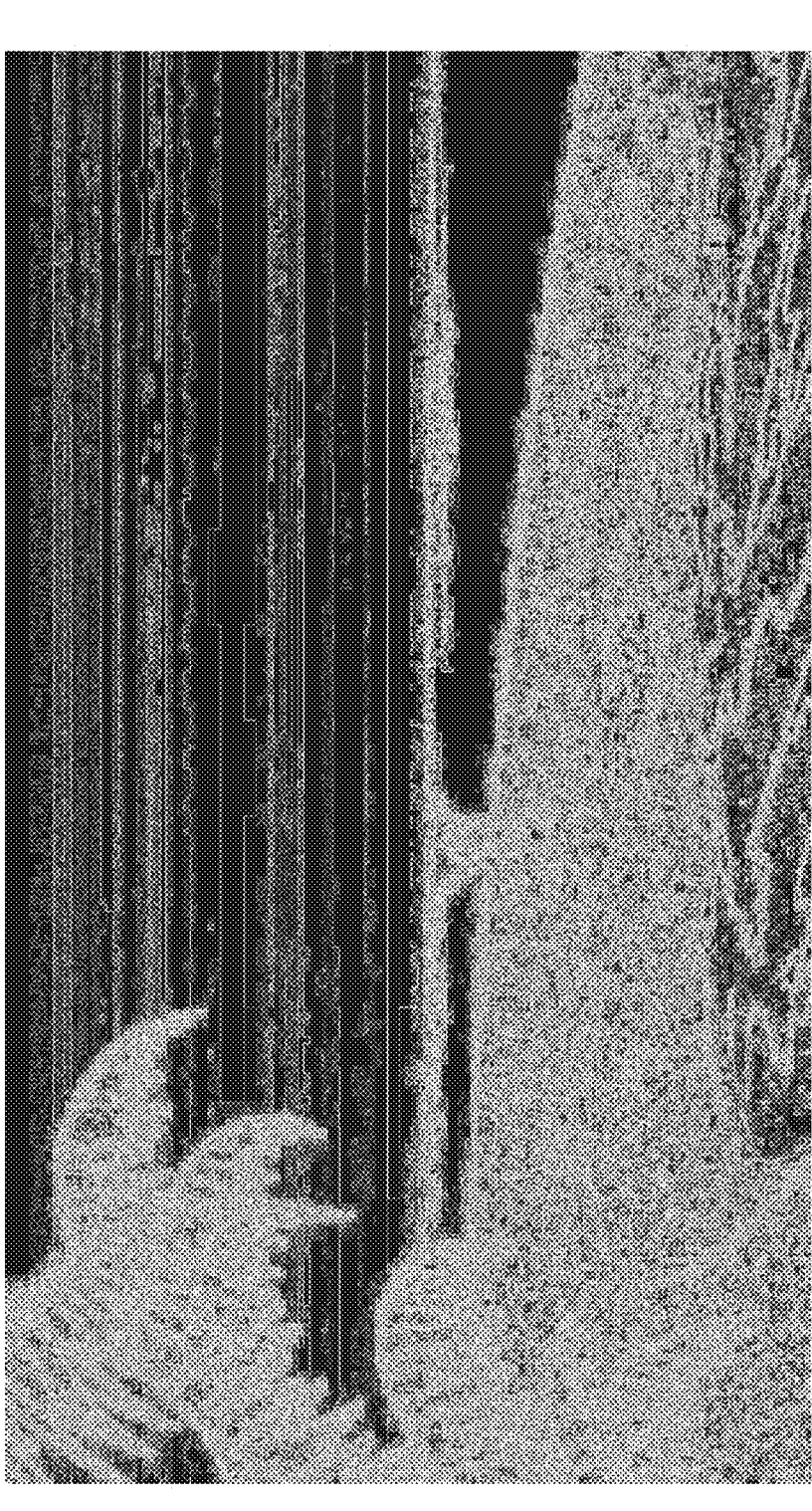
FIG. 5 depicts an example of a gradient map according to some embodiments.

As discussed above, a difference in a characteristic for pixels of the input image may be performed by difference calculation system 304. FIG. 5 depicts an example 500 of a gradient map according to some embodiments. The gradient map may show the pixel intensity differences for pixels. The pixels in regions with more complex texture may have stronger radiance than pixels smooth regions. For example, the region with the palm tree may have stronger gradient values shown with more radiance than the region that includes the sky.

Potential Banding Regions Decision

Figure 6:
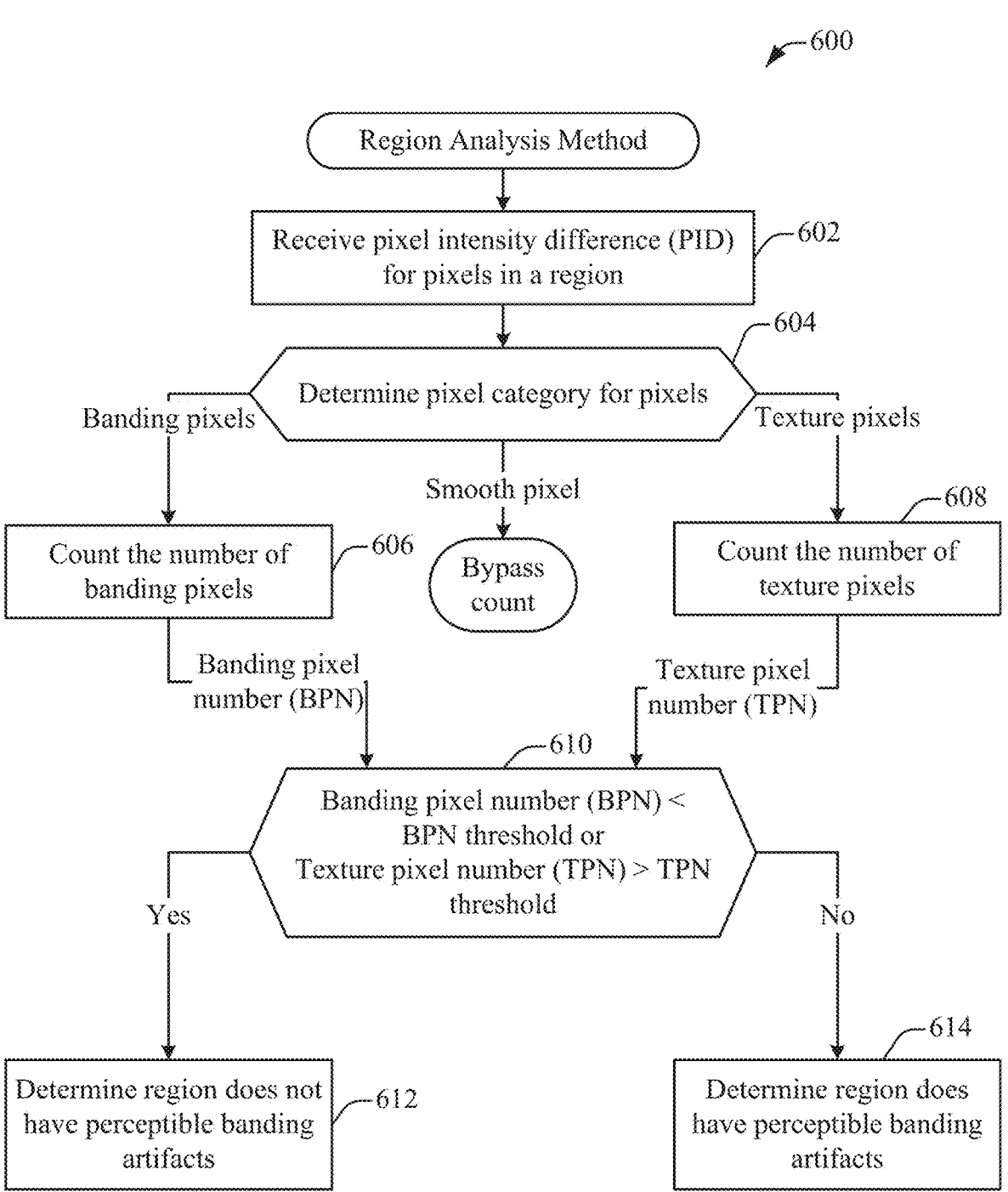
FIG. 6 depicts a simplified flowchart for determining region types according to some embodiments.
Figure 7:
FIG. 7 depicts a graph showing the cross-sectional representation of pixel intensity change to illustrate different pixels according to some embodiments.
Figure 8:
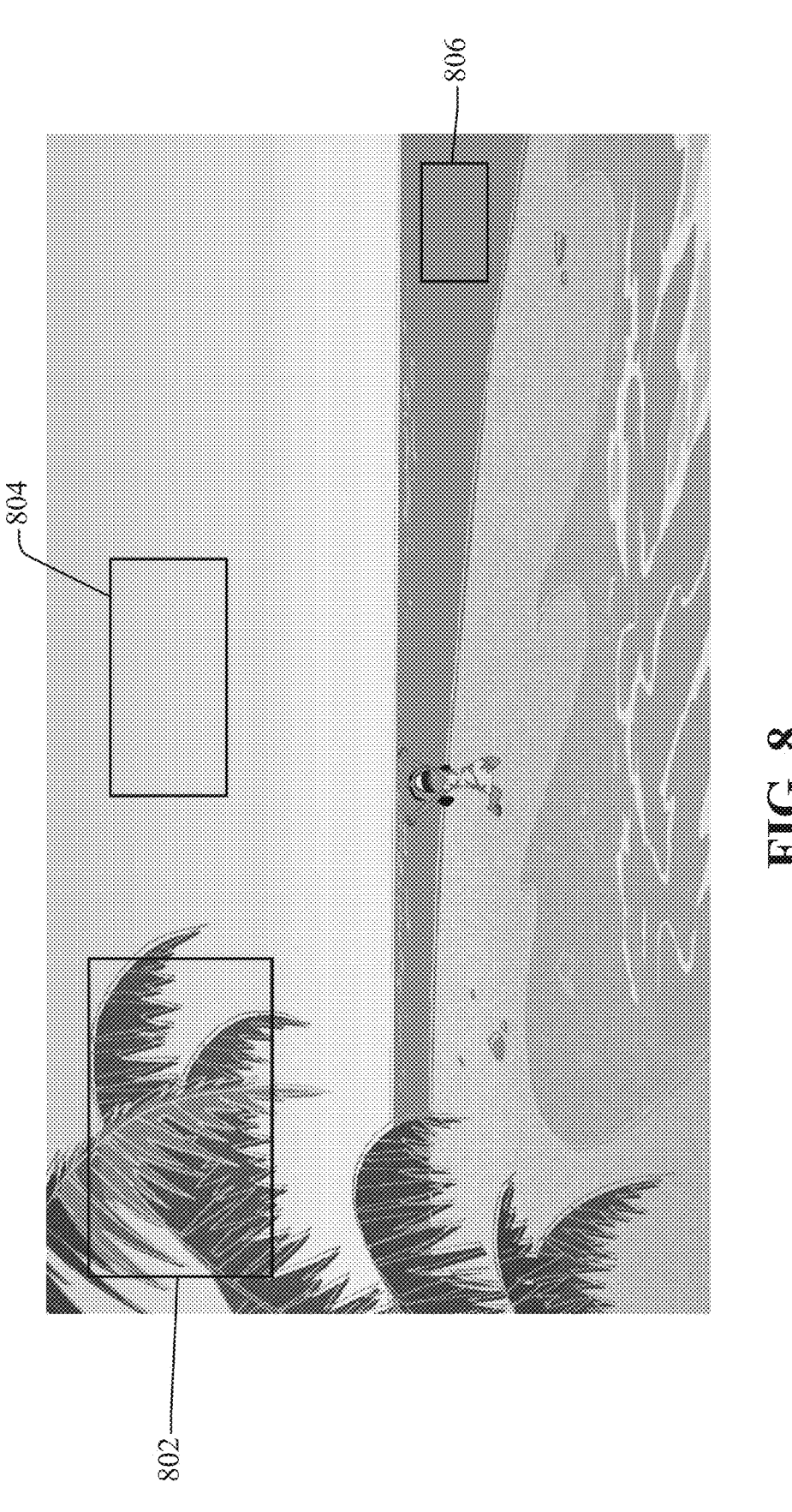
FIG. 8 depicts an example of different classifications of regions in an image according to some embodiments.

As discussed above, selection system 306 classifies regions into different types. FIG. 6 depicts a simplified flowchart 600 for determining region types according to some embodiments. The process determines which regions may have perceptible banding artifacts according to the pixel intensity difference within the respective regions. The following process may be performed for each region. For example, the regions that are output by region division system 302 may be processed using the following method. At 602, selection system 306 receives a pixel intensity difference (PID) for pixels in a region. The pixel intensity difference may be determined by difference calculation system 304.

At 604, selection system 306 determines a pixel classification for pixels in the region. In some embodiments, each pixel may be analyzed in the region. Different pixel classifications may be used. For example, classifications may be a banding pixel, a texture pixel, or a smooth pixel. Other classifications may also be used. Selection system 306 may use different thresholds to determine the classifications for each pixel. For example, a pixel intensity difference low threshold (DLT) and a pixel intensity difference high threshold (DHT) may be used. The pixels may be divided into three categories of a texture pixel, a smooth pixel, and a banding pixel. Selection system 306 classifies a pixel as a texture pixel when the intensity is greater than or equal to the pixel intensity difference high threshold. Selection system 306 classifies a pixel into a smooth pixel when the intensity difference is less than the pixel intensity difference low threshold. Pixels are bypassed and not counted if they belong to the smooth pixel classification. Selection system 306 classifies a pixel as a banding pixel when the intensity difference is greater than or equal to the pixel intensity difference low threshold and less than the pixel intensity difference high threshold. Accordingly, the texture pixels may have the largest variance due to having an intensity difference greater than the high threshold. The intensity difference between banding pixels may be small due to being in between the low threshold and the high threshold. The intensity difference between smooth pixels may be negligible because they are less than the low threshold.

Once all the classifications for all pixels are determined, the number of pixels in the banding pixel classification and the texture pixel classification are counted. If banding pixels are determined for pixels, at 606, selection system 306 counts the number of banding pixels. If texture pixels are determined for pixels, at 608, selection system 306 counts the number of texture pixels. If smooth pixels are determined, the process does not perform a count of the banding pixels, the texture pixels, or the smooth pixels. This process may bypass the rest of the method.

After counting the number of banding pixels and texture pixels, at 610, selection system 306 compares the banding pixel number to a banding pixel number threshold and the texture pixel number to a texture pixel number threshold. The banding pixel number threshold may be set to a threshold where if the banding pixel number in the region is less than the threshold, there may be too few banding pixels that may not be noticed as perceptible by human users. The texture pixel number threshold may be set to a number where the texture number in the region may be greater than the threshold such that the banding artifacts may not be perceptible due to the texture found in the region. As described above, the texture may mask the banding artifacts as compared to artifacts that may be more perceptible in smooth and flat regions.

If either condition is met, at 612, selection system 306 determines the region does not have perceptible banding artifacts. For example, if the banding pixel number is less than the banding pixel number threshold, the region may have only a few pixels that are categorized as banding pixels and may not be perceptible in regions by the human eye. If the texture pixel number is greater than the texture pixel number threshold, this means that the region is a texture region and banding artifacts may not be perceptible in regions with complex texture. Accordingly, selection system 306 may determine that banding artifacts may not be perceptible when either of these two conditions are met. If neither of these conditions are met, at 614, selection system 306 determines the region does have perceptible banding artifacts. Other methods may also be used to classify the regions. For example, a proportion of banding pixels to texture pixels may be used to classify the region. If the proportion of banding pixels to texture pixels is greater than a threshold, then the region is classified as a region that does have perceptible banding artifacts, or if the proportion of banding pixels to texture pixels is less than a threshold, then the region is classified as a region that does not have perceptible banding artifacts.

In some embodiments, the pixel intensity difference low threshold may be set to a value of 2 and the pixel intensity difference high threshold may be set to a value of 10, but other values may be used. The range of a gradient for a pixel is 0~2^bitdepth. For an 8 bit image, its range is 0~255. The banding pixel number threshold may be set to a value of 100 pixels, and the texture pixel number threshold may be another pixel number, such as derived from the region size in a fixed ratio, such as region size divided by its ratio. The region size may be the number of pixels in the region and the ratio may be set to 0.2.

FIG. 7 depicts a graph 700 showing the cross-sectional representation of pixel intensity change to illustrate different pixels according to some embodiments. The Y-axis may represent pixel intensity and the X-axis represents pixels. The dots in graph 700 may represent the pixel intensity of respective pixels of the region. The graph is presented conceptually to illustrate the differences in pixel intensities that may result in different classifications for a region. At 702, a texture region may include pixels with a large variance in pixel intensity. At 704, a banding pixel region may include a pixels with a smaller variance in pixel intensity. At 706, a smooth region may include a pixel intensity variation that is negligible. As seen, these smooth pixels may have a pixel intensity that is almost negligible in difference. However, the pixel intensity of pixels in a banding region may slightly change.

FIG. 8 depicts an example 800 of different classifications of regions in an image according to some embodiments. The following regions are used as an example to show different categories of regions. That is, the regions may or may not have been divided from the semantic base region division. At 802, a texture region is shown. For example, the texture region may have complex textures of a palm tree leaves. The banding artifacts may not be perceptible in this region due to the complex textures. In this case, the region may have a texture pixel number that is greater than the texture pixel number threshold. At 804, a banding pixel region is shown. There may be banding artifacts shown in this region of the sky, which includes slight variations in pixel intensity. In this case, the region may have a texture pixel number that is less than the texture pixel number threshold and the banding pixel number may be more than the banding pixel number threshold. At 806, a smooth region is shown. In the smooth region, the banding pixel number may be less than the banding pixel number threshold. In the smooth region, the banding artifacts may not be perceptible.

Selection system 306 may generate information for the regions differently. In some embodiments, the input to selection system 306 may be the region boundaries in the image and the pixel intensity difference for pixels within the regions selection. Selection system 306 may output a binary map that indicates which regions are classified as having perceptible banding artifacts. For example, a value of "1" may be output for a region that is determined to have perceptible banding artifacts and a value of "0" may be output for a region that is determined to not have perceptible banding artifacts.

Merge system 106 may be located outside of the logic of prediction network 108 or inside the logic of prediction network 108. When outside of prediction network 108, merge system 108 may mask the banding artifacts in the input image using different methods. In some embodiments, merge system 106 may use the banding artifact information to mask the input image directly. For example, the masking method may retain regions that are determined to have banding artifacts and filter out other regions, such as smooth regions and texture regions. The pixels in the regions that are determined not to have perceptible banding artifacts may be masked using different methods. For example, the masking may replace the values for pixels in regions that may not have perceptible banding artifacts with a fixed value. A fixed value may be determined differently, such as region by region, per image, or may have predefined values for all images. In some embodiments, a region-by-region fixed value may be derived from the average pixel values in each region. A pixel-level fixed value may be derived from the average pixel values in the whole image. The predefined values may be set as a random value within a range of pixel values. Other methods may also be used.

In other embodiments, the banding information may be input as another channel of the input image. For example, the channels of the input image may include channels for each color channel of red, green, and blue. An additional channel of the banding artifact information may be input as a fourth channel. The banding information may be a binary map to indicate whether each region has banding or not. For example, a value for each pixel may be provided or a value for each region with coordinates for the regions. Merge system 106 may be included in the logic of prediction network 108, and may perform the masking in prediction network 108.

Figure 9:
FIG. 9 depicts an example of an image that has been masked according to some embodiment.
Figure 9:
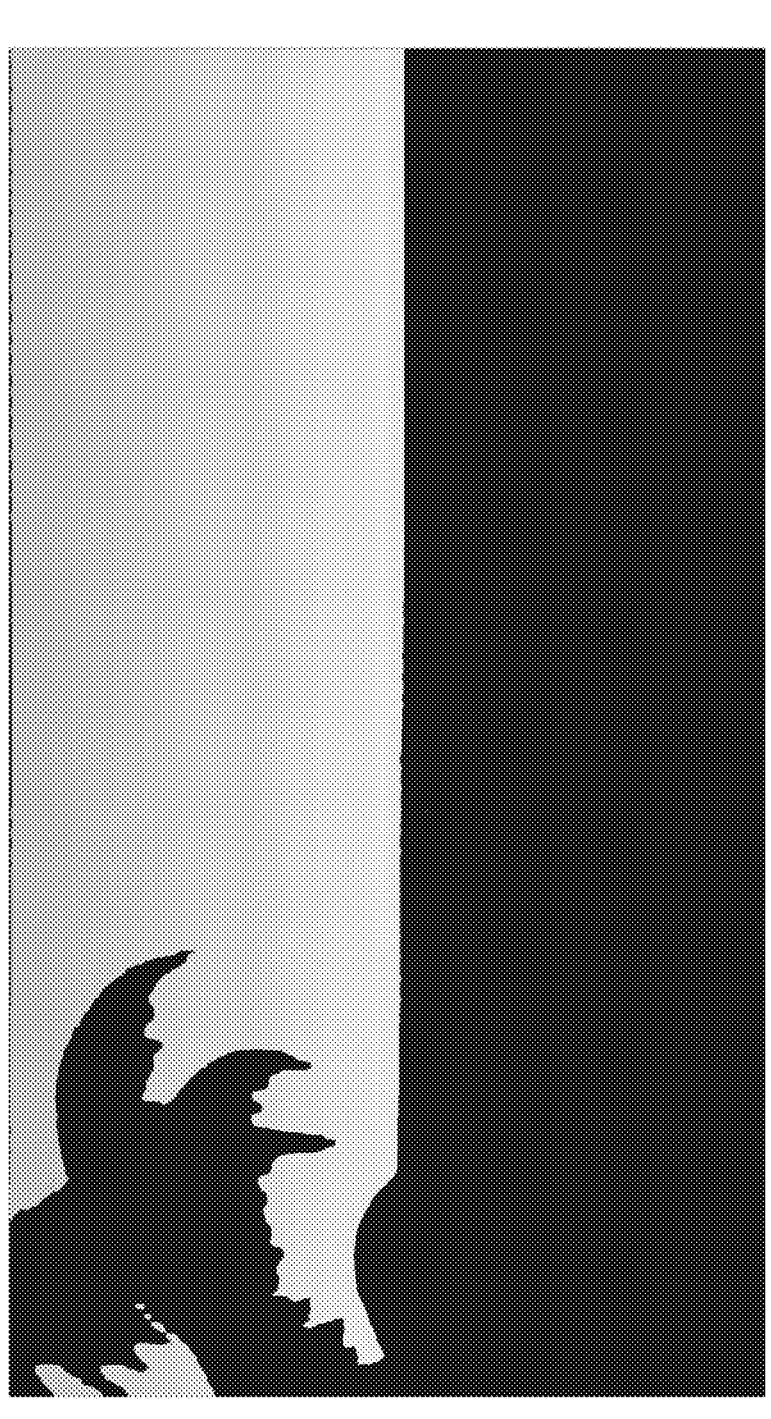

FIG. 9 depicts an example of an image that has been masked according to some embodiment. The image at 900 is shown as the result of the masking when masking is performed directly or after the masking is performed using the binary map as input as an extra channel into prediction network 108.

In this example, a "0" pixel value is used to replace regions in which banding artifacts are determined to be not perceptible. This means for all images, if one region is determined to have banding artifacts that are not perceptible, all pixel values in that region are set to the value of 0. In this example, the value of 0 in the regions are shown as solid black regions. Regions that were determined to include banding artifacts that were perceptible have not been set to the value of 0, and may retain their original values.

In general, the sky of the image shown in FIG. 2 does not have its pixel value set to zero and the sand, water, and palm tree in FIG. 2 are in regions in which the pixel values are set to 0. Using the masking may improve the banding assessment performed by prediction network 108. For example, the trees and beach are masked because they are texture regions and it would be hard to perceive banding artifacts and the sea is masked due to it being a smooth region in which banding artifacts would be hard to perceive. Prediction network 108 can then focus on to assessing the banding artifacts in the sky where they may be most perceptible. This may make the score more accurate. If the banding artifacts are analyzed in a region where the palm tree is located, the score may be different and indicate the banding artifacts are more severe if this region includes banding artifacts. However, the banding artifacts where the palm tree is located may not be perceptible to a user, and thus may not affect the visual opinion of the image by the user. However, masking out the palm tree allows the prediction network 108 to assess the banding artifacts where they may be perceived by a user.

Prediction network 108 may accept the size and dimensions of the image that has been masked directly. If the banding information is input as another channel, prediction network 108 can receive the banding information in an additional channel. Also, prediction network 108 may include processing logic to process the banding information, such as using the banding information as a mask to mask the information received in the other channels. The output of prediction network 108 may be a banding artifacts score that may assess the severity of the banding artifacts. In other embodiments, prediction network 108 may output multi-dimensional features, such as feature values for each pixel. The features may then be used to determine a final banding artifact score. Other methods may also be used to generate the score.

The following will now describe inputting a texture map as an auxiliary input into prediction network 108.

Texture Map Input as Auxiliary Input

In some embodiments, merge system 106 may use different types of texture characteristics. In some embodiments, image characterization system 106 may use entropy to characterize the texture. The entropy may measure the local variation in the randomness of pixels within the image. The entropy-based texture map may capture the overall texture patterns in an image, which makes it particularly useful for identifying subtle textures that may not be detected by edge detectors. Additionally, entropy-based texture mapping can provide a more nuanced representation of the image texture by assigning varying entropy values. Although entropy is described, other texture characterizations may be used, such as edge detection and gradients.

Entropy quantifies the uncertainty or randomness inherent in the image. The entropy provides a measure of local variation in pixel intensities. Textured regions may be characterized by intricate patterns and varying intensity values, and may exhibit higher entropy values. Conversely, flat regions may lack significant intensity variations, and possess lower entropy values. That is, textured regions may have increased variance, which may increase the uncertainty and randomness in a region; and flat regions may have lower variance in values, which decreases the uncertainty and randomness in the region.

Figure 10:
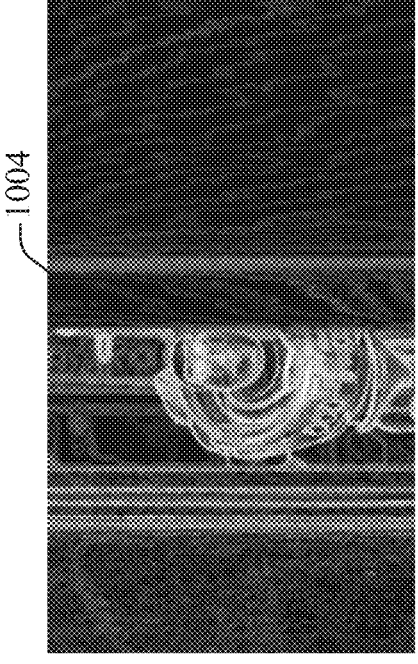
FIG. 10 depicts an example of an input image and an entropy map for the image according to some embodiments.
Figure 10:
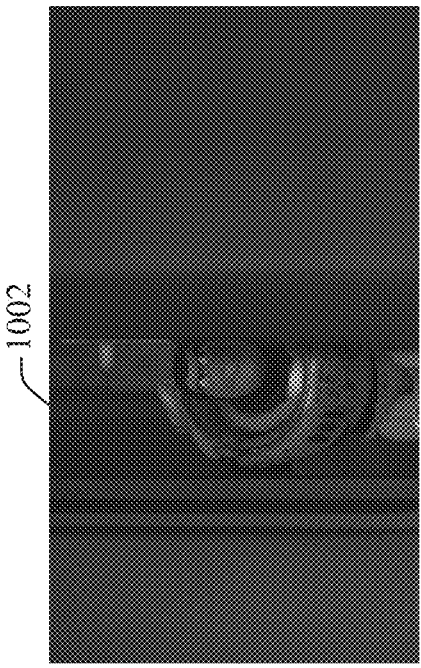

To determine the entropy for an image, texture characterization system 106 may calculate the entropy using different methods. For example, the image may be broken up into patches, which may be predefined regions in the image. Texture characterization system 106 may measure the entropy within the patch. For example, the randomness or complexity of the data of the pixel intensities in the patch may be measured using an entropy formula. To facilitate easier visualization and comparison of entropy values across the image, texture characterization system 106 may normalize the values. This may involve mapping the entropy values to a common range, such as between 0 and 1. Then, texture characterization system 106 creates an entropy map for the image. The normalized entropy values may be assigned to corresponding pixels in a newly-created grayscale image. FIG. 10 depicts an example of an input image and an entropy map for the image according to some embodiments. The image is shown at 1002 and the entropy map is shown at 1004. The estimated entropy map may serve as a texture map, where brighter regions indicate higher texture and darker regions indicate flatter areas. The side areas of the image at 1002 may be flatter or smoother, and these regions are darker in the entropy map. In the middle, the picture of the character may include more randomness or complexity, and this region is brighter in the entropy map.

Texture characterization system 104 may classify pixels as in a textured region or flat region (or a smooth region). For example, a thresholding operation is applied to the generated entropy map. In some embodiments, a threshold value is selected that can classify pixels as either in a textured region or a flat region. Texture characterization system 104 may assign pixels with entropy values exceeding the threshold as being in a textured region and pixels with entropy values falling below the threshold as being in a flat region. The threshold value may depend on the specific application and the desired level granularity in textured classification. Also, in other embodiments, the pixels may be classified as being in a textured region, banding region, and a smooth region as discussed above.

Figure 11:
FIG. 11 depicts an example that uses different threshold values to classify pixels according to some embodiments.

FIG. 11 depicts an example 1100 that uses different threshold values to classify pixels according to some embodiments. As the threshold value is increased, then the pixels that are classified as flat pixels may increase in the classification and the pixels classified as textured pixels may decrease because the threshold value is going up. The example at 1100 shows entropy maps for thresholds of 0.1, 0.2, 0.3, . . . , 1.0. As the threshold increases, the pixels that are classified in the texture classification decrease, and the pixels classified as in a flat region increase. As can be seen, the pixels classified with entropy values with a texture classification are more radiant than the pixel values that are classified in a flat pixels. At 1102, with a threshold of 0.1, it could be seen that the entropy map includes more pixels that are classified with a texture classification because most of the pixels are radiant. At 1104, with a threshold of 0.6, more pixels have been classified with a flat classification and are black. At 1106, with a threshold of 1.0, all pixels have been classified as flat and the image is black. As the threshold increases, less pixels are classified as texture pixels.

The following will describe different embodiments of prediction network 108 for using the texture map as a weighting/attention network or as an input that is concatenated with the image.

Figure 12:
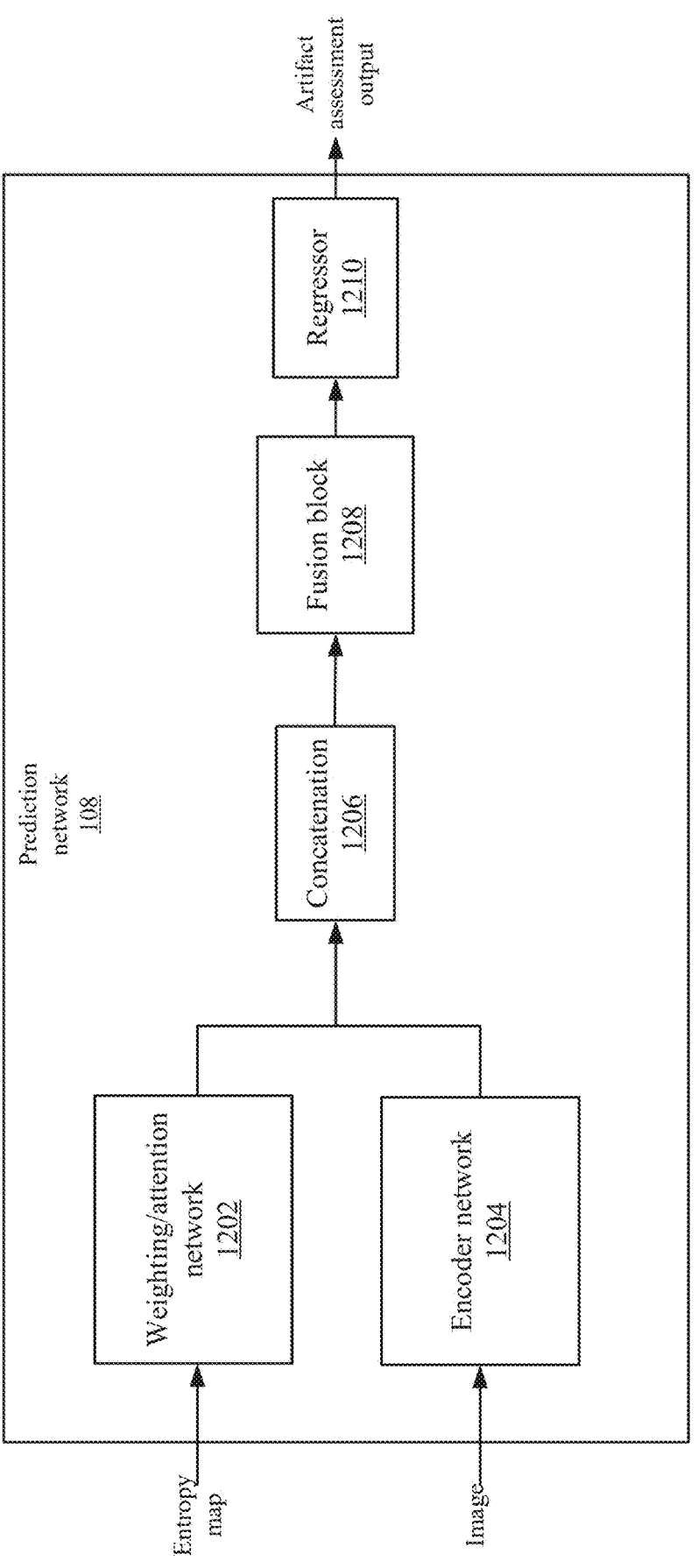
FIG. 12 depicts a first example of a prediction network according to some embodiments.

FIG. 12 depicts a first example of prediction network 108 according to some embodiments. Prediction network 108 may use the texture map as a weighting/attention function. A weighting/attention network 1202 receives the texture map. Weighting/attention network 1202 may determine attention weights for respective pixels based on the values for the texture map. For weighting, weighting/attention network 1202 may normalize the entropy values in the entropy map of the image, such as between the range between 0 and 1. The values may be interpreted as probability map. Then, weighting/attention network 1202 uses the normalized map values as weights for pixels in the image. For example, weighting/attention network 1202 may multiply the pixel values of the image by their corresponding attention weights. For an attention network, self-attention mechanism may be used. For example, weighting/ attention network 1202 uses the normalized map as an attention mask that is used in self-attention to focus more on relevant regions of the image based on the attention weights that indicate values where artifacts may be more perceptible.

Also, an encoder network 1204 receives the image and can extract features from the image. Encoder network 1204 may output a representation of the image. Encoder network 1204 may transform the image into a lower-dimensional representation in a latent space. The representation may capture what is considered the more important characteristics of the image.

At 1206, concatenation of the weights and representation of the image is performed. The concatenation may be performed per channel. For example, if the image is input as red, green, and blue channels, each channel is concatenated with the weights.

A fusion block 1208 may fuse the concatenated channels together. For example, the information from the channels may be combined using different methods.

A regressor may perform regression on the fused information and output an artifact assessment score. Regressor 1210 may include different networks, such as a multi-layer perception network or may perform support vector regression. Regressor 1210 is trained to receive the input from fusion block 1208 and map the input to an artifact assessment score. Regressor 1210 may learn relationships between the input and the artifact assessment score during training of the parameters of the neural network. Although a regression network is described, other networks may be used that could map a high dimensional latent feature to a score. The artifact assessment score may assess the banding artifacts in the image. Using the weighting or attention function may improve the banding assessment performed by prediction network 108. For example, the pixels for the trees and beach may be weighted lower because the entropy is high and it would be hard to perceive banding artifacts and the pixels for the sea is weighted lower due to the entropy being negligible in which banding artifacts would be hard to perceive. Pixels for the sky may be weighted higher due to it having entropy in which banding artifacts would be easier to perceive. Prediction network 108 can then focus on to assessing the banding artifacts in the sky where they may be most perceptible. This may make the score more accurate. If the banding artifacts are given more weight in a region where the palm tree is located, the score may be different and indicate the banding artifacts are more severe if this region includes banding artifacts. However, the banding artifacts where the palm tree is located may not be perceptible to a user, and thus may not affect the visual opinion of the image by the user. However, giving less weight to pixels of the palm tree allows the prediction network 108 to assess pixels with more weight where the banding artifacts may be perceived by a user.

Figure 13:
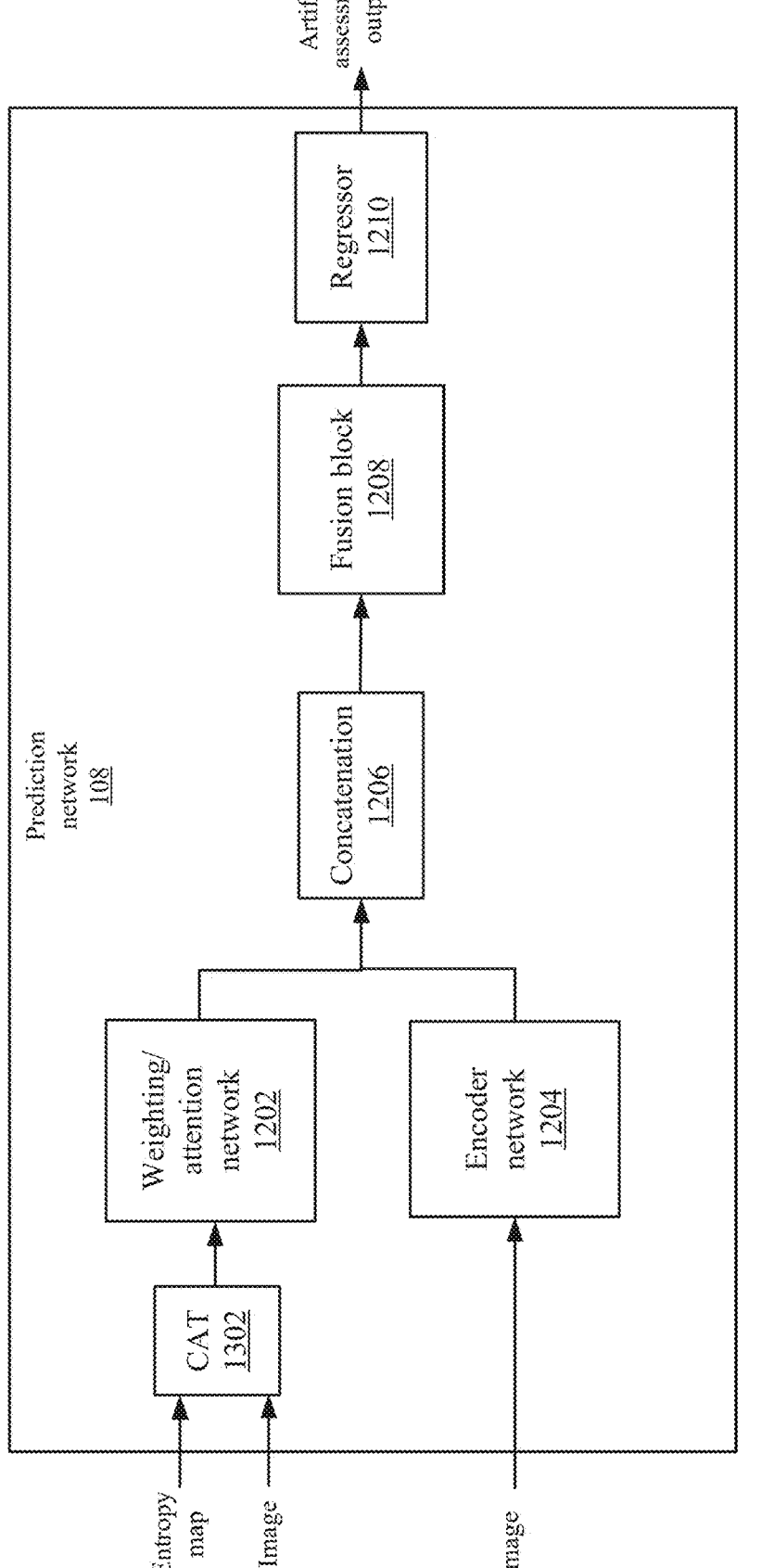
FIG. 13 depicts a second example of the prediction network according to some embodiments.

FIG. 13 depicts a second example of prediction network 108 according to some embodiments. The image may be concatenated with the texture map, and then input into weighting/attention network 1202. In this case, a concatenation 1302 may combine (e.g., concatenate or other combination operation) the texture map with the image. For example, the image may be characterized in channels such as a red, blue, and green channel. The texture map may be concatenated with the channels. The operation of encoder network 1204, concatenation 1206, fusion block 1208, and regressor 1210 may operate similarly as described in FIG. 12.

Figure 14:
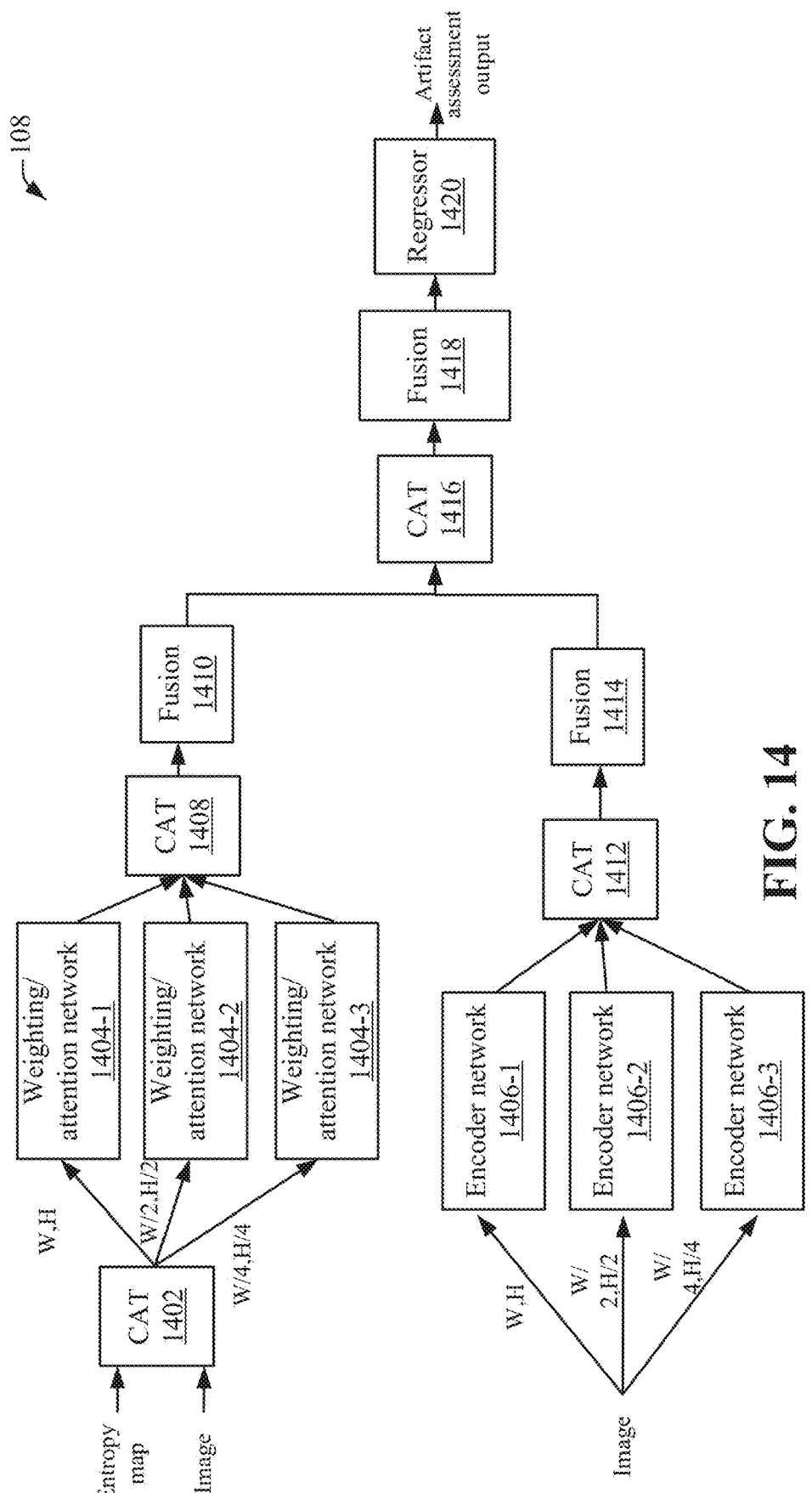
FIG. 14 depicts a third example of the prediction network for multi-scale analysis according to some embodiments.

The prediction network 108 may also perform a multi-scalar analysis. FIG. 14 depicts a third example of prediction network 108 for multi-scale analysis according to some embodiments.

At 1402, a concatenation of the image and texture map is performed. The concatenation may be performed for multiple channels of the image. This may be similar to what was described above with respect to 1302 in FIG. 13. The image does not need to be combined with the entropy map, however. Rather, only the entropy map may be input. Then, the concatenated image and texture map may be input at different scales to respective weighting/attention networks 1404. For example, a full scale of the image (W, H, where W is the width of the image and H is the height of the image) is input into a first weighting/attention network 14–4=1, a half-scale representation (w/2, r/2) is input to second weighting/attention network 1404-2, and a quarter-scale (w/4, r/8) representation is input into a third weighting/attention network 1404-3. A concatenation 1408 of the output of the weighting/attention networks 1404 is performed. This combines the weights from different scales. Then, at 1410, the channel-wise results are fused.

The image is also split into a multi-scale image of the same dimensions as the representations of the texture map. Image respective encoder networks 1406 process the different scales of the image to generate multiple representations. At 1412, a concatenation is performed for the representations of the multi-scales to combine the representations of different channels. At 1414, the different channels are fused to combine the channels. A concatenation 1416 is performed to concatenate the output from fusion 1414 and the weights that are output from fusion 1410. A fusion block 1418 performs a fusion of the output from concatenation 1416. The fusion may be similar to that performed by fusion block 1208. A regressor 1420 performs regression to output an artifact assessment score. Regressor 1420 is similar to regressor 1210 in FIG. 12 or FIG. 13.

Figure 15:
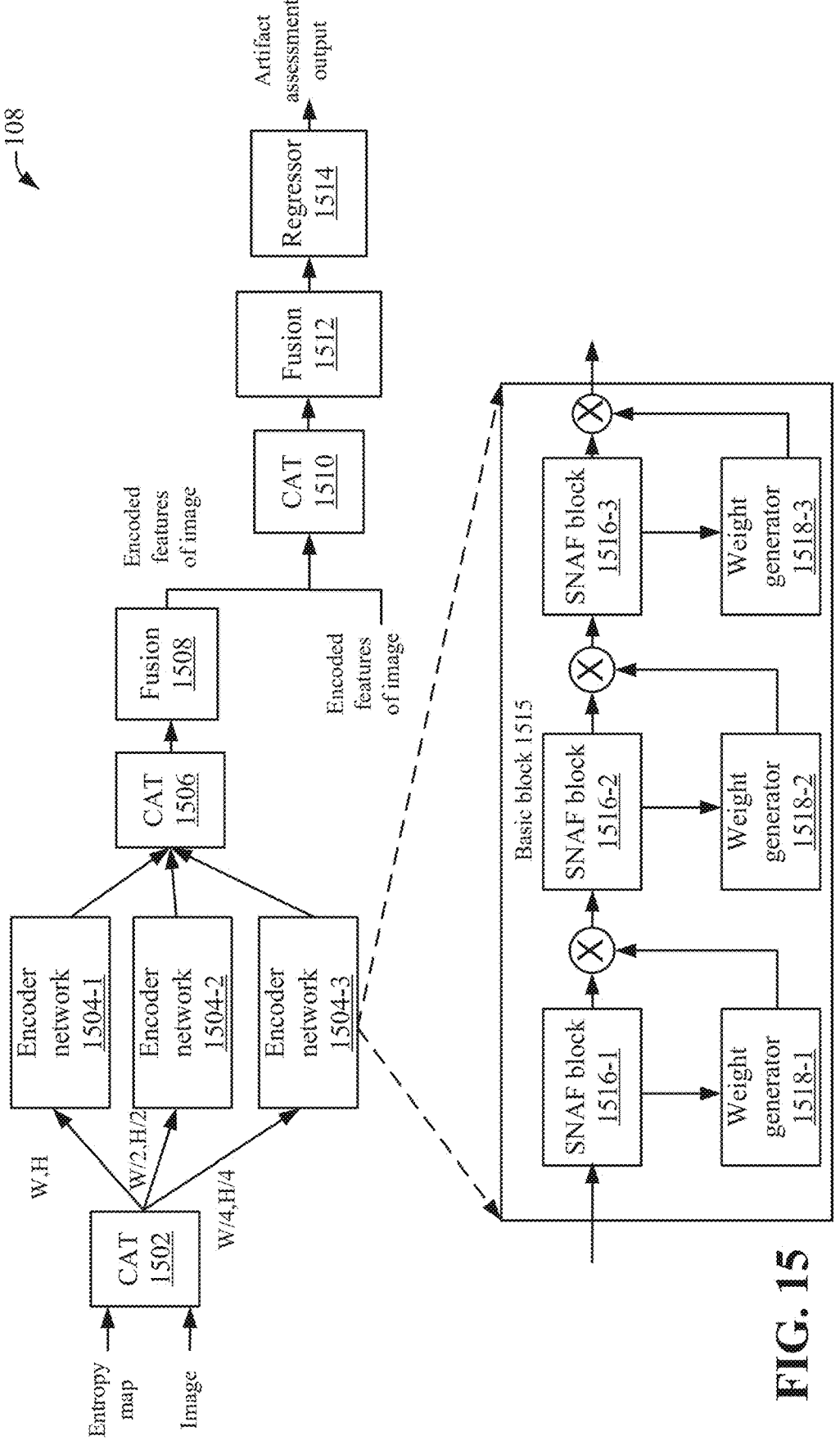
FIG. 15 depicts an example that uses the entropy map as an input into prediction network 108 according to some embodiments.

FIG. 15 depicts an example that uses the entropy map as an input into prediction network 108 according to some embodiments. At 1502, a channel-wide concatenation of the entropy map and red, green, and blue channels of the image is performed. The concatenation is then input into multiple encoders 1504-1 to 1504-3. Each encoder may be configured to process different scales of the concatenated image and entropy map. For example, the scales may be a full-scale (H,W), half-scale (H/2, W/2) and a quarter scale (H/4, W/4). The encoders 1504-1 to 1504-3 may extract the features of the concatenated entropy map and image. The output may be concatenated at a concatenation block 1506. A fusion block 1508 may concatenate the outputs from encoders 1504-1 to 1504-3 into encoded features, such as 4096 feature dimension values. Also, separately, the image may also be encoded into encoded features of the image. The two encoded representations are concatenated at a concatenation block 1510. Then, a fusion block 1512 is performed. A multi-layer perception projector may generate encoded features. The encoded features are concatenated with the coded features of the image and passed through a series of fusion blocks that may fuse the channel-wise information. Regressor 1514 performs regression to output an artifact assessment score, and is similar to regressor 1210 in FIG. 12.

In some embodiments, respective encoders 1504 may include a basic block 1515. Each basic block 1515 may include simple-NAF (SNAF) blocks 1516-1 to 1516-3 to extract features and feature weight generators 1518-1 to 1518-3 for attention calculation. The attention calculation may weight the features, such as based on weights determined using the entropy map. Encoders other than SNAF blocks may be used to extract features. Basic block 1515 is shown may process the image in different scales, such as the height and width are down-sampled by half with a pixel shuffle and the channel dimension is increased accordingly from encoder network 1504-1 (W/H), encoder network 1504-2 (W/2, H/2), and encoder network 1504-3 (W/4, H/4). The basic block is executed on different resolutions for capturing the information from different scales and a better receptive field of the network. The output of basic block 1515 is used as the output of encoder network 1504, which provides the extracted features of the image and entropy map. Using the entropy map may improve the banding assessment performed by prediction network 108. For example, the pixels for the trees and beach may not be focused on because the entropy is high and it would be hard to perceive banding artifacts and the pixels for the sea are not focused on due to the entropy being negligible in which banding artifacts would be hard to perceive. Pixels for the sky may be focused on due to it having entropy in which banding artifacts would be easier to perceive. Prediction network 108 can then focus on to assessing the banding artifacts in the sky where they may be most perceptible. This may make the score more accurate. If the banding artifacts are focused on in a region where the palm tree is located, the score may be different and indicate the banding artifacts are more severe if this region includes banding artifacts. However, the banding artifacts where the palm tree is located may not be perceptible to a user, and thus may not affect the visual opinion of the image by the user. However, focusing less on pixels of the palm tree allows the prediction network 108 to assess pixels where the banding artifacts may be perceived by a user.

Prediction network 108 may be trained using a mean squared error on the predicted artifact assessment score. For example, the mean squared error loss may be generated based on the predicted artifact assessment score and the labeled the artifact assessment score. The parameters of prediction network may be adjusted where the parameter values of the image encoder are frozen during training.

CONCLUSION

Accordingly, texture information may be used differently to improve the analysis of artifacts and images. The use of the texture information may improve the accuracy of the prediction. Also, computing resources may be saved using the texture information.

SYSTEM

Figure 16:
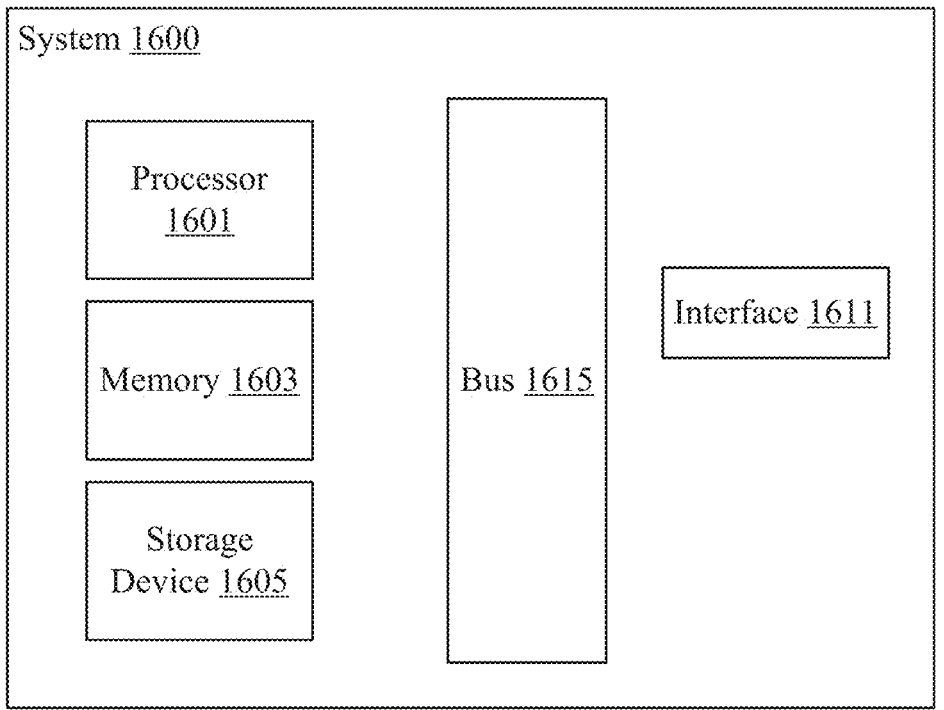
FIG. 16 illustrates one example of a computing device according to some embodiments.

FIG. 16 illustrates one example of a computing device according to some embodiments. According to various embodiments, a system 1600 suitable for implementing embodiments described herein includes a processor 1601, a memory 1603, a storage device 1605, an interface 1611, and a bus 1615 (e.g., a PCI bus or other interconnection fabric.) System 1600 may operate as a variety of devices such as server system 102, or any other device or service described herein. Although a particular configuration is described, a variety of alternative configurations are possible. The processor 1601 may perform operations such as those described herein. Instructions for performing such operations may be embodied in the memory 1603, on one or more non-transitory computer readable media, or on some other storage device. Various specially configured devices can also be used in place of or in addition to the processor 1601. Memory 1603 may be random access memory (RAM) or other dynamic storage devices. Storage device 1605 may include a non-transitory computer-readable storage medium holding information, instructions, or some combination thereof, for example instructions that when executed by the processor 1601, cause processor 1601 to be configured or operable to perform one or more operations of a method as described herein. Bus 1615 or other communication components may support communication of information within system 1600. The interface 1611 may be connected to bus 1615 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
receiving an image to analyze for artifacts;
determining texture information that characterizes texture in the image;
merging the texture information with the image, wherein the texture information is used to focus an analysis of artifacts in regions of the image, wherein merging the texture information with the image comprises:
segmenting the image into a plurality of regions based on object detection of objects in respective regions;
determining a difference in a characteristic of pixels in respective regions in the plurality of regions; and
using the difference of the characteristic in respective regions to classify respective regions with a classification in a plurality of classifications, wherein using the difference of the characteristic to classify respective regions comprises:
determining a category for pixels in a region;
counting a first number of pixels in a first classification and a second number of pixels in a second classification; and
determining whether the region is associated with the first classification or the second classification based on the first number of pixels and the second number of pixels, wherein:
the region is associated with the first classification when the first number of pixels is less than a first threshold and the second number of pixels is greater than a second threshold, and
the first threshold is based on a number of pixels that are classified as artifact pixels and the second threshold is based on a number of pixels that are categorized as texture pixels; and
outputting a score based on the processing of the image that assesses the artifacts in the image.

2. The method of claim 1, wherein determining texture information comprises:
analyzing the image to extract characteristics of texture in the image; and
generating a texture map using the extracted characteristics of texture.

3. The method of claim 1, wherein determining texture information comprises:
determining entropy of pixels in the image, gradients of pixels in the image, or a local pixel value difference for pixels in the image as the texture information.

4. The method of claim 1, wherein merging the texture information with the image comprises:
analyzing the texture information to determine the plurality of regions in the image; and classifying regions in the plurality of regions into the plurality of classifications based on respective texture information for the respective regions.

5. The method of claim 4, wherein merging the texture information with the image comprises:

masking one or more regions in the image based on a classification of the one or more regions, wherein masking filters the one or more regions in the image.

6. The method of claim 5, wherein filtering the one or more regions comprises adjusting pixel values of the one or more regions.

7. The method of claim 4, wherein merging the texture information with the image comprises:

inputting the plurality of classifications into a prediction network, wherein the prediction network uses respective classifications of regions in the plurality of regions to filter regions in the image.

8. The method of claim 1, wherein:

a first classification indicates a region does not have perceptible artifacts, and a second classification indicates a region does have perceptible artifacts.

9. The method of claim 1, wherein merging the texture information with the image comprises:

determining an entropy of pixels in the image; and analyzing the entropy of pixels based on a threshold to classify the pixels in a first classification or a second classification, wherein pixels values are adjusted when classified in the second classification.

10. The method of claim 1, wherein merging the texture information with the image comprises:

inputting the image into one or more channels of a prediction network;

inputting the texture information as an auxiliary channel into the prediction network; and processing the one or more channels and the auxiliary channel to generate the score.

11. The method of claim 10, wherein:

the auxiliary channel and the one or more channels are combined to generate combined channels, and the combined channels are analyzed to generate the score.

12. The method of claim 10, wherein:

the texture information is combined with the image and input into the auxiliary channel.

13. The method of claim 10, further comprising:

applying attention or weighting based on the texture information to pixels of the image; and generating the score based on the attention or weighting that is applied.

14. A non-transitory computer-readable storage medium having stored thereon computer executable instructions, which when executed by a computing device, cause the computing device to be operable for:

receiving an image to analyze for artifacts;

determining texture information that characterizes texture in the image;

merging the texture information with the image, wherein the texture information is used to focus an analysis of artifacts in regions of the image, wherein merging the texture information with the image comprises:

segmenting the image into a plurality of regions based on object detection of objects in respective regions;

determining a difference in a characteristic of pixels in respective regions in the plurality of regions; and using the difference of the characteristic in respective regions to classify respective regions with a classification in a plurality of classifications, wherein using the difference of the characteristic to classify respective regions comprises;

determining a category for pixels in a region;

counting a first number of pixels in a first classification and a second number of pixels in a second classification; and determining whether the region is associated with the first classification or the second classification based on the first number of pixels and the second number of pixels, wherein:

the region is associated with the first classification when the first number of pixels is less than a first threshold and the second number of pixels is greater than a second threshold, and the first threshold is based on a number of pixels that are classified as artifact pixels and the second threshold is based on a number of pixels that are categorized as texture pixels; and outputting a score based on the processing of the image that assesses the artifacts in the image.

15. The non-transitory computer-readable storage medium of claim 14, wherein merging the texture information with the image comprises:

analyzing the texture information to determine the plurality of regions in the image; and classifying regions in the plurality of regions into the plurality of classifications based on respective texture information for the respective regions.

16. The non-transitory computer-readable storage medium of claim 14, wherein merging the texture information with the image comprises:

inputting the image into one or more channels of a prediction network;

inputting the texture information as an auxiliary channel into the prediction network; and processing the one or more channels and the auxiliary channel to generate the score.

17. An apparatus comprising:

one or more computer processors; and a computer-readable storage medium comprising instructions for controlling the one or more computer processors to be operable for:

receiving an image to analyze for artifacts;

determining texture information that characterizes texture in the image;

merging the texture information with the image, wherein the texture information is used to focus an analysis of artifacts in regions of the image, wherein merging the texture information with the image comprises:

segmenting the image into a plurality of regions based on object detection of objects in respective regions;

determining a difference in a characteristic of pixels in respective regions in the plurality of regions; and using the difference of the characteristic in respective regions to classify respective regions with a classification in a plurality of classifications, wherein using the difference of the characteristic to classify respective regions comprises:

determining a category for pixels in a region;

counting a first number of pixels in a first classification and a second number of pixels in a second classification; and determining whether the region is associated with the first classification or the second classification based on the first number of pixels and the second number of pixels, wherein:

the region is associated with the first classification when the first number of pixels is less than a first threshold and the second number of pixels is greater than a second threshold, and the first threshold is based on a number of pixels that are classified as artifact pixels and the second threshold is based on a number of pixels that are categorized as texture pixels; and outputting a score based on the processing of the image that assesses the artifacts in the image.

18. The non-transitory computer-readable storage medium of claim 16, wherein:

the auxiliary channel and the one or more channels are combined to generate combined channels, and the combined channels are analyzed to generate the score.

19. The non-transitory computer-readable storage medium of claim 16, wherein:

the texture information is combined with the image and input into the auxiliary channel.

20. The non-transitory computer-readable storage medium of claim 16, further operable for:

applying attention or weighting based on the texture information to pixels of the image; and generating the score based on the attention or weighting that is applied.

\*     \*     \*     \*     \*